Patented Dec. 5, 1933

1,937,528

UNITED STATES PATENT OFFICE 1,937,528

PROCESS FOR THE PRODUCTION OF ACETIC ACID

Horace Finningley Oxley and Walter Henry Groombridge, Spondon, near Derby, England, assignors to Celanese Corporation of America, a corporation of Delaware No Drawing. Application October 30, 1931, Serial No. 572,222, and in Great Britain December 4, 1930

12 Claims. (Cl. 260—116)

This invention relates to the manufacture of acetic acid by the oxidation of acetaldehyde.

It is known that acetic acid can be produced by passing air or oxygen into or through liquid acetaldehyde in presence of catalysts. In this manner very high percentage acetic acid may be obtained; in fact substantially all the aldehyde present can be oxidized to acetic acid. We have found, however, that when the reaction liquor has attained a relatively high concentration of acetic acid, such as over 80% and particularly 90% or over, the reaction slows down very considerably, and we have further found that substantial economic advantages accrue from conducting the oxidation so that the concentration of the acetic acid does not exceed such value.

According to the invention, therefore, the oxidation is performed to such degree that the oxidation reaction is still vigorous or relatively so, and particularly to such a degree that the concentration of the reaction liquor attains between about 50 and 80% acetic acid (preferably between 60 and 70%) and the acetic acid is recovered from the resulting reaction liquor. In particular we perform the oxidation as a continuous process, fresh aldehyde being added to the reaction liquor intermittently or continuously with the reaction to keep the concentration of the reaction liquor at the desired concentration of acetic acid or between the desired limits of such concentration, whilst the reaction liquor is also removed intermittently or continuously with the reaction for the same purpose. The reaction liquor leaving the reaction vessel may be heated to remove the aldehyde, and the aldehyde so removed may be returned to the reaction vessel.

In performing the invention we may use oxygen or a gaseous mixture containing the same, such for instance as air. We do not limit ourselves as to the pressure at which the oxygen, or gaseous mixture containing the same may be employed, e. g. atmospheric pressure, reduced pressure, or increased pressure may be employed, the use of increased pressure being especially useful when gaseous mixtures containing oxygen are used. The oxidation reaction may be performed in presence of any catalyst capable of promoting the oxidation of liquid acetaldehyde to acetic acid, such for instance as manganese acetate, uranium oxide, ferric oxide, ferric acetate, chromium oxide, or vanadium pentoxide, or the catalysts described in United States application S. No. 563,006 filed September 15th, 1931, namely manganic salts, or the catalysts described in British Patents Nos. 154,304 and 154,680, i. e. china clay or kaolin or the residue which remains after igniting animal charcoal or mixtures thereof with sodium acetate.

The oxygen, either pure or mixed with inert gases as in air, may be introduced into the liquid in any convenient way, preferably in the form of fine bubbles. This fine state of division of the gas is preferably further promoted by stirring or otherwise agitating the reaction liquid.

The oxidation may be performed at any desired temperatures such for instance as those commonly employed for the oxidation of liquid aldehyde, e. g. from about 0° to 20° C., but higher temperatures e. g. 30° to 40° C. or more may, if desired, be employed, particularly when using a gaseous mixture containing oxygen for performing the oxidation.

It has been found advantageous to cool the reaction liquor and/or the vapour space above the same to low temperatures (e. g. about 0° to 5° C.) during the initial stages of the reaction and/or intermittently during the reaction. Such cooling is very helpful in producing a rapid start of the reaction or obviating any lagging in the reaction.

If desired the reaction vessel may be provided with a condenser or the like to avoid loss of aldehyde through evaporation or through entraining by any escaping gas. Advantageously escaping gases (unused oxygen or air or nitrogen) may be scrubbed with a solvent or liquid such as glacial or concentrated acetic acid or it may be with some of the reaction liquor itself, and the scrubbings returned to the reaction vessel. Such scrubbing may for instance be effected by providing the reaction vessel with a condenser, scrubbing tower or the like, or a series thereof, through which the scrubbing liquid is caused to flow counter-current to the escaping gases, and advantageously in cases where there is a vapour space in the reaction vessel above the level of the reaction liquor, the scrubbing liquid in its return to the reaction liquor is caused to scrub said vapour space. For instance the scrubbing liquor may be caused to traverse the vapour space in the form of fine drops, spray or the like.

When the process is performed under pressure and the reaction vessel is fitted with a condenser suitable pressure reducing valves or the like are of course employed between the reaction vessel and the condenser.

As some of the catalyst is carried off with the reaction liquor leaving the reaction vessel, the presence of the requisite or desired amount of catalyst in the reaction vessel can be assured or maintained by adding fresh catalyst to the reaction vessel intermittently or continuously with the reaction. For instance, the catalyst may be mixed with the aldehyde introduced into the reaction vessel. In starting the reaction initially we prefer to charge the reaction vessel with aldehyde together with the catalyst or catalysts, and to oxidize the same up to the desired concentration, e. g. to a concentration of between 50 and 70% acetic acid, and thereafter to add aldehyde and remove the reaction liquor to maintain the liquor in the reaction vessel to the desired concentration or within the desired limits of concentration of the acetic acid.

The acetic acid may be recovered from the liquor leaving the reaction vessel in any desired way and in any desired degree of purity. Thus, for instance, the liquor may be heated or subjected to fractionation to remove the aldehyde as far as possible, and if desired or necessary the acid so obtained may be subjected to further distillation in presence or absence of permanganate to obtain the acid in as pure a form as possible. The fractionation or heating of the acid can, if desired, be performed continuously with its removal or passage from the reaction vessel. Advantageously the reaction liquor, after leaving the reaction vessel, is warmed, e. g. to about 60 to 70° C. to expel the bulk of unoxidized acetaldehyde, which aldehyde may be returned to the reaction vessel for oxidization, the residual acetic acid being if desired subjected to fractionation or other treatment to obtain pure acetic acid.

What we claim and desire to secure by Letters Patent is:—

1. Process for the oxidation of aldehyde to acetic acid in the liquid phase, characterized in that the oxidation is effected in such manner that the concentration of the acetic acid does not attain such value that vigorous or relatively vigorous reaction is prevented and the acetic acid is recovered from the resulting reaction liquor.

2. Process for the continuous oxidation of aldehyde to acetic acid in the liquid phase, characterized in that the reaction liquor is maintained at such concentration of acetic acid that the reaction is at least relatively vigorous, fresh aldehyde being added to the liquor and the reaction liquor being withdrawn continuously or from time to time to maintain the liquor undergoing reaction at the desired concentration or limits of concentration of acetic acid, the liquor withdrawn being subjected to treatment to recover the acetic acid contained therein.

3. Process according to claim 1, wherein gases escaping from the reaction vessel are subjected to scrubbing by a liquid comprising acetic acid and the scrubbings are returned to and caused to scrub the vapor space above the reaction liquor.

4. Process according to claim 1, wherein gases escaping from the reaction vessel are subjected to scrubbing with a portion of the reaction liquor and the scrubbings are returned to and caused to scrub the vapor space above the body of the reaction liquor.

5. Process for the production of acetic acid by oxidizing acetaldehyde in the liquid phase, characterized in that acetic acid formed is only allowed to attain a concentration in the reaction liquor of less than 80% and is separated from the reaction liquor.

6. Process for the production of acetic acid by oxidizing acetaldehyde in the liquid phase, characterized in that acetic acid formed is only allowed to attain a concentration in the reaction liquor of less than 70% and is separated from the reaction liquor.

7. Process for the production of acetic acid by oxidizing acetaldehyde in the liquid phase, characterized in that oxidation is discontinued when the acetic acid in the reaction liquor attains a concentration of between 50 and 80% and acetic acid is separated from the reaction liquor produced.

8. Process for the production of acetic acid by oxidizing acetaldehyde in the liquid phase, characterized in that oxidation is discontinued when the acetic acid in the reaction liquor attains a concentration of between 60 and 70% and acetic acid is separated from the reaction liquor produced.

9. Process for the continuous production of acetic acid by oxidizing acetaldehyde in the liquid phase and continuously, or from time to time, replacing a portion of the reaction liquor by fresh acetaldehyde, characterized in that the concentration of acetic acid in the reaction liquor is maintained between 50 and 80% and acetic acid is separated from the withdrawn reaction liquor.

10. Process according to claim 9, wherein gases escaping from the reaction vessel are subjected to scrubbing by a liquid comprising acetic acid and the scrubbings are returned to and caused to scrub the vapor space above the reaction liquor.

11. Process for the continuous production of acetic acid by oxidizing acetaldehyde in the liquid phase and continuously, or from time to time, replacing a portion of the reaction liquor by fresh acetaldehyde, characterized in that the concentration of acetic acid in the reaction liquor is maintained between 60 and 70% and acetic acid is separated from the withdrawn reaction liquor.

12. Process according to claim 11, wherein gases escaping from the reaction vessel are subjected to scrubbing by a portion of the reaction liquor and the scrubbings are returned to and caused to scrub the vapor space above the body of the reaction liquor.

HORACE FINNINGLEY OXLEY.
WALTER HENRY GROOMBRIDGE.